July 19, 1949.  F. DERSCH  2,476,536
1, 3, 5-TRIAZINES AS STABILIZING AGENTS FOR
SILVER-HALIDE EMULSIONS
Filed Nov. 18, 1947
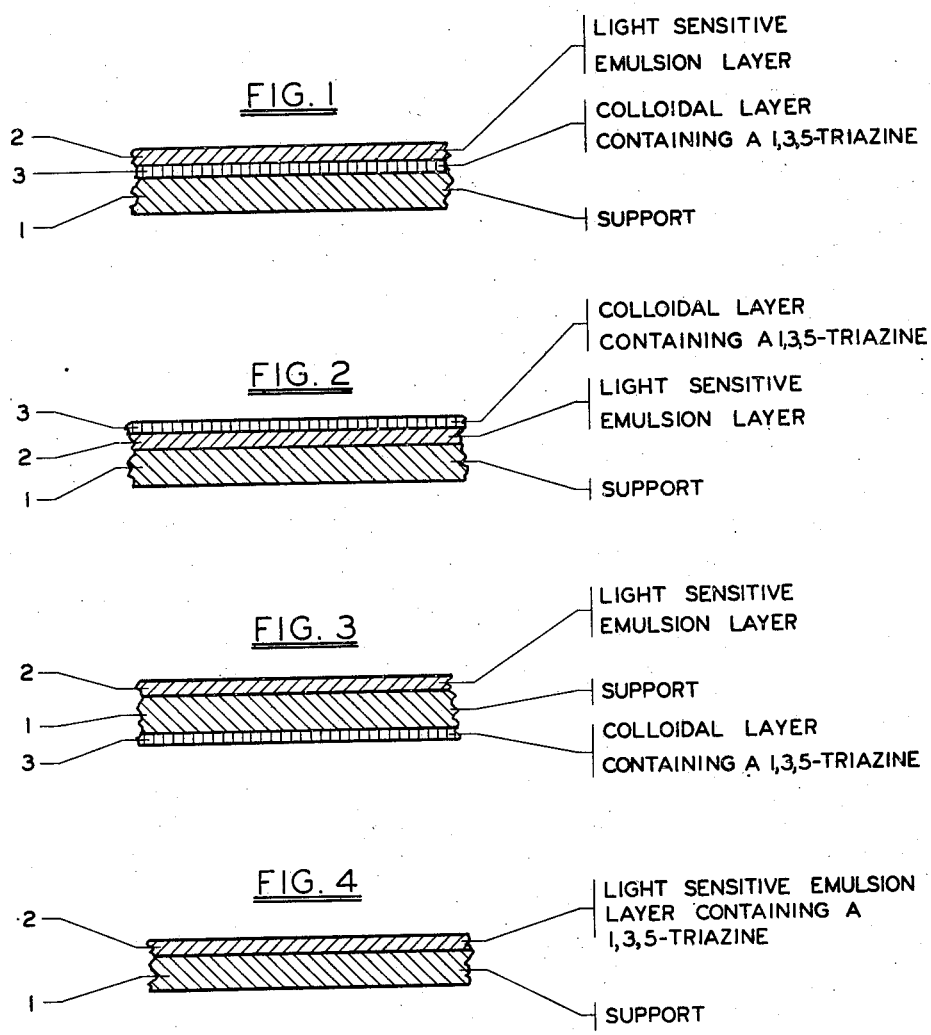
INVENTOR
FRITZ DERSCH
BY
ATTORNEYS Patented July 19, 1949

2,476,536

UNITED STATES PATENT OFFICE 2,476,536

1,3,5-TRIAZINES AS STABILIZING AGENTS FOR SILVER-HALIDE EMULSIONS

Fritz Dersch, Binghamton, N. Y., assignor to General Aniline & Film Corporation, New York, N. Y., a corporation of Delaware Application November 18, 1947, Serial No. 786,643

11 Claims. (Cl. 95—7)

This invention relates to the stabilization of light-sensitive silver-halide emulsions, and particularly to the use of substituted 1,3,5-triazines as stabilizers for silver-halide emulsions.

It is known that light-sensitive emulsions, such as gelatin silver-halide emulsions, have a decided tendency to fog. The fog may be of two types, namely, yellow fog and chemical (gray) fog. The yellow fog, sometimes referred to as color fog or dichroic fog, is essentially a colloidal deposit of silver, the color intensity and general appearance of which are determined by the minute particle size and degree of subdivision. The fog is chiefly yellow in color and is most apparent in the lighter portions of a negative. The color may vary, however, and the colloidal silver particles may, for example, appear green by reflected light and yellow or red by transmitted light. The so-called chemical fog, or gray fog, on the other hand, is the more common and is formed in a number of ways. It may be caused by premature exposure, by excessive ripening of the emulsions, or by the storage of the film, particularly at high temperatures or for unusually long periods of time.

It is also known that mercapto tetrazoles and tetrazoles containing at least one =NH group, the hydrogen atom of which is capable of substitution by silver, have been described as being effective in preventing an increase in fog and thus stabilizing or controlling the keeping quality of light-sensitive silver-halide emulsions. Although these compounds have the ability to give to the emulsions to which they are added, greater stability and a steeper gradation, they have a definite shortcoming in that they, to some extent, lower the sensitivity of the emulsions.

The primary object of the present invention is to provide stabilizers or fog inhibiting agents which tend to prevent the formation of chemical fog in light-sensitive silver-halide emulsions.

A further object is to provide stabilizers or antifogging agents for light-sensitive silver-halide emulsions, which do not lower the sensitivity of the emulsion, and which increase its stability.

Still further objects and advantages will appear from the following specification.

I have found that the above objects are accomplished by the use of substituted 1,3,5-triazines which do not contain an =NH group in their configuration, the hydrogen atom of which is capable of substitution by silver, and which are superior to the tetrazoles heretofore employed. The substituted 1,3,5-triazines utilized in accordance with the present invention are characterized by the following structural formula:

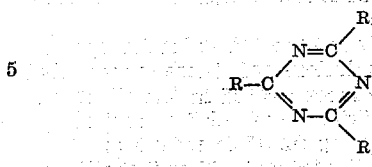

wherein R represents an amino or methylamino group, $R_1$ represents an amino, methylamino, or mercapto group, and $R_2$ represents an amino or methylmercapto group.

The following examples will serve to illustrate certain ways in which the stabilizers of my invention are prepared and applied, but are not to be construed as limiting the invention.

Example I

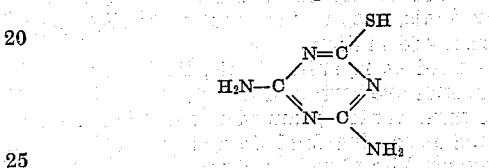

2,4-diamino-6-mercapto-1,3,5-triazine

A mixture consisting of 1 mol of dicyandiamide and 2 mols each of ammonium thiocyanate and hydrochloric acid (5N) was evaporated to dryness on a steam bath. The residue was leached with 50 cc. of ammonium hydroxide and the filtered ammoniacal solution neutralized with hydrochloric acid and evaporated to a small volume. The product crystallizes upon cooling.

Example II

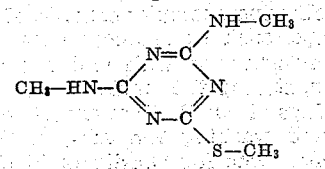

2-methylmercapto-4,6-dimethylamino-1,3,5-triazine 2 grams of trithiocyanuric acid trimethyl ester were treated with 5.2 cc. (in slight excess) of a 33% aqueous solution of methylamine in a bomb at 100° C. for 6 to 8 hours, and the reaction mixture allowed to cool to room temperature. The mixture was then heated gently on a steam bath to drive off methylmercaptan and the residue dissolved in 5 to 10 cc. of concentrated hydrochloric acid. To this solution, water was added slowly until no further precipitate formed. The solution was filtered and the filtrate concentrated on a steam bath to a small volume, neutralized with ammonium hydroxide and then dried. The dry product was washed with water to remove ammonium chloride, dissolved in 0.001 N HCl and then concentrated to a solid. The solid was recrystallized from boiling water.

Example III

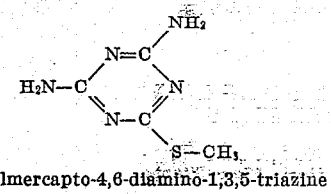

2-methylmercapto-4,6-diamino-1,3,5-triazine 2 grams of trithiocyanuric acid trimethyl ester were digested in a bomb with 8 cc. (in excess) of alcoholic ammonia for 5 hours at 160° C. The reaction mixture was cooled to room temperature and the crystals filtered off and extracted several times with hot water. The extract was cooled, filtered, dissolved in ethanol, filtered and concentrated to dryness.

Beneficial effects in gray fog reduction may be obtained when solutions of these substituted 1,3,5-triazines are incorporated in the silver-halide emulsions as "ripening finals" or as "coating finals." By "ripening final" is meant an addition made during the "ripening" or "sensitivity-increasing" stage of the emulsion making process. Such additions may be designed to increase the sensitivity of the emulsion or to minimize gray fog formation. By "coating final" is meant an addition made to the emulsion just prior to coating it on a suitable support (glass, film, etc.) when the emulsion has nearly obtained its maximum sensitivity. The functions of these coating finals are nearly the same as those of the ripening finals, i. e., to increase sensitivity or to minimize fog formation.

When used as ripening finals, the substituted 1,3,5-triazines are best used in a concentration of $\frac{1}{10}$ to 10 mgs. per kilogram of wet emulsion, and when used as coating finals in a concentration of 1–50 mgs. per kilo of wet emulsion.

Special advantage seems to be gained when plates coated with emulsion containing substituted 1,3,5-triazines are processed after standing for long periods of time. There is a marked reduction in gray fog as compared with a processed plate coated with emulsion with no added substituted 1,3,5-triazine. These advantages seem to be gained with a very minimum loss of sensitivity and contrast.

The method of testing the stabilizers employed in the following examples consists of coating two film strips, such as cellulose acetate, with the same emulsion, one with and one without any stabilizer, storing the emulsions in an incubator for six days at 50° C., then exposing, developing, fixing, and washing the same under standard conditions. The fog density or blackening produced in the unexposed areas in the two emulsions is then measured in a transmission densitometer of standard type.

The following examples will serve to illustrate certain ways in which the stabilizers of my invention have been applied.

Example IV

A photographic film coated with an ordinary gelatin-bromoiodide emulsion of normal speed and contrast on development under standard conditions, after incubation for six days at 50° C., gave a fog of 0.28 density. Another film coated with the same emulsion containing an addition of 5 mgs. of 2,4-diamino-6-mercapto-1,3,5-triazine per 1000 cc. of emulsion equivalent to about 50 grams of silver nitrate and developed under the same conditions, after the same incubation, gave a fog of only 0.08 density.

Example V

Example IV was repeated with the exception that an equivalent quantity of 2-methylmercapto-4,6-dimethylamino-1,3,5-triazine was substituted for 2,4-diamino-6-mercapto-1,3,5-triazine. The results obtained were almost identical with those obtained in Example IV.

Example VI

Example IV was again repeated with the exception that 8 mgs. of 2-methylmercapto-4,6-diamino-1,3,5-triazine was substituted for 5 mgs. of 2,4-diamino-6-mercapto-1,3,5-triazine. After incubation and development, the emulsion containing 2-methylmercapto-4,6-diamino-1,3,5-triazine gave a fog of only 0.08 density.

Further experiments have shown that emulsions containing stabilizers in accordance with my invention have not only improved keeping qualities (i. e., a reduction in the fog produced by incubation or by long storage), but have greatly diminished and, in some cases completely eliminated changes of speed to which some emulsions are susceptible.

The stabilizers, which I have described and employed may be used in various kinds of emulsions. In addition to being useful in orthochromatic and panchromatic emulsions, they may also be used in non-sensitized emulsions and X-ray emulsions. If used with sensitizing dyes they may be added to the emulsion before or after the dyes are added. The dispersing agents for the silver-halides may be gelatin or other colloid such as water-soluble cellulose derivatives, e. g., hydroxyethyl cellulose, methyl cellulose, carboxyoxy cellulose, low acetyl value cellulose acetate, and the like. The stabilizers may also be employed in gelatin or other colloid, such as polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; cellulose derivatives, e. g., cellulose nitrate, cellulose acetate, the lower fatty acid esters of cellulose including simple and mixed esters, ethers of cellulose, and the like, as an under or overcoat for the emulsion, or as backing layer for the support. Moreover, they may be incorporated in the support for the sensitive emulsion layer or in an intermediate layer between the sensitive emulsion layer and the support, such as the baryta coating commonly used in photographic papers, or they may be incorporated in a protective layer coated upon the emulsion surface, or the otherwise finished photographic material may be bathed in an alcohol or alcohol-water solution containing the stabilizer.

In the accompanying drawing the various figures are enlarged section views of photographic materials having anti-fogging layers made according to my invention.

As shown in Figure 1, the support 1, which may be of any suitable material such as glass, cellulose ester, synthetic resin, or paper, is provided with an anti-fogging layer 3, containing one of the 1,3,5-triazines referred to above. The light-sensitive emulsion layer 2 is is attached to the anti-fogging layer 3.

Figure 2 illustrates a similar material in which the support 1 is coated with a light-sensitive emulsion layer 2, and on the latter side there is provided an anti-fogging layer 3 containing one of said 1,3,5-triazines.

I claim:

1. A photographic material comprising a base and a light-sensitive silver-halide emulsion carried thereby, said photographic material containing, in fog inhibiting amount, a 1,3,5-triazine having the general formula:

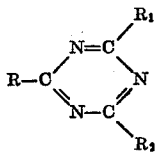

where R represents a member selected from the class consisting of amino and methylamino, $R_1$ represents a member selected from the class consisting of amino, methylamino and mercapto groups, and $R_2$ represents a member selected from the class consisting of amino and methylmercapto groups.

2. A photographic material comprising a base and a light-sensitive silver-halide emulsion carried thereby, said photographic material containing, in fog inhibiting amount, a 1,3,5-triazine having the formula:

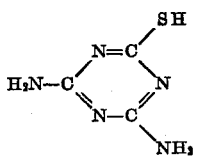

3. A photographic material comprising a base and a light-sensitive silver-halide emulsion carried thereby, said photographic material containing, in fog inhibiting amount, a 1,3,5-triazine having the formula:

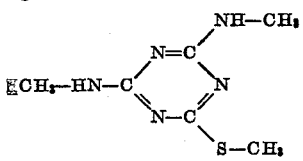

4. A photographic material comprising a base and a light-sensitive silver-halide emulsion carried thereby, said photographic material containing, in fog inhibiting amount, a 1,3,5-triazine having the formula:

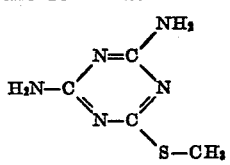

5. A photographic material comprising a light-sensitive silver-halide emulsion containing, in fog inhibiting amount, a 1,3,5-triazine having the general formula:

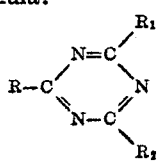

where R represents a member selected from the class consisting of amino and methylamino, $R_1$ represents a member selected from the class consisting of amino, methylamino and mercapto groups, and $R_2$ represents a member selected from the class consisting of amino and methylmercapto groups.

6. A photographic material comprising a light-sensitive silver-halide emulsion containing, in fog inhibiting amount, a 1,3,5-triazine of the formula:

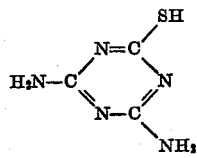

7. A photographic material comprising a light-sensitive silver-halide emulsion containing, in fog inhibiting amount, a 1,3,5-triazine of the formula:

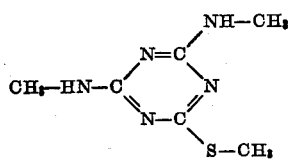

8. A photographic material comprising a light-sensitive silver-halide emulsion containing, in fog inhibiting amount, a 1,3,5-triazine of the formula:

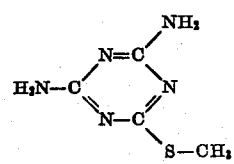

9. A photographic gelatino silver-halide emulsion containing from about 0.1 mg. to about 50 mgs. per liter of emulsion of a 1,3,5-triazine of the formula:

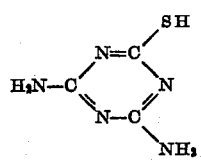

10. A photographic gelatino silver-halide emulsion containing from about 0.1 mg. to about 50 mgs. per liter of emulsion of a 1,3,5-triazine of the formula:

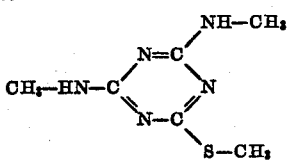

11. A photographic gelatino silver-halide emulsion containing from about 0.1 mg. to about 50 mgs. per liter of emulsion of a 1,3,5-triazine of the formula:

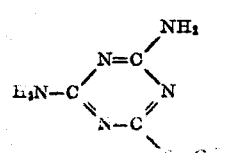

FRITZ DERSCH.

No references cited.